(12) United States Patent
Ballew (10) Patent No.: US 12,053,902 B2
(45) Date of Patent: Aug. 6, 2024

(54) ARTICULATED MAST SECTION FOR CHOP SAWS

(71) Applicant: Tony J. Ballew, Livingston, MT (US)

(72) Inventor: Tony J. Ballew, Livingston, MT (US)

( * ) Notice: Subject to any disclaimer, the term of this patent is extended or adjusted under 35 U.S.C. 154(b) by 103 days.

(21) Appl. No.: 17/801,640

(22) PCT Filed: Feb. 24, 2021

(86) PCT No.: PCT/US2021/019486
§ 371 (c)(1),
(2) Date: Aug. 23, 2022

(87) PCT Pub. No.: WO2021/173728
PCT Pub. Date: Sep. 2, 2021

(65) Prior Publication Data
US 2023/0089943 A1    Mar. 23, 2023

Related U.S. Application Data

(60) Provisional application No. 62/980,445, filed on Feb. 24, 2020.

(51) Int. Cl.
*B27B 5/20*        (2006.01)
*B23D 45/04*    (2006.01)

(52) U.S. Cl.
CPC ............ *B27B 5/208* (2013.01); *B23D 45/048* (2013.01)

(58) Field of Classification Search
CPC .............................. B27B 5/208; B23D 45/048
USPC ........................................................ 83/471.3
See application file for complete search history.

(56) References Cited

U.S. PATENT DOCUMENTS

| | | | | |
|---|---|---|---|---|
| 8,322,261 | B2 * | 12/2012 | Liu ........................... | B27B 5/29 83/477.1 |
| 8,631,734 | B2 * | 1/2014 | Liu ....................... | F16C 11/045 83/490 |
| D704,235 | S * | 5/2014 | Liu ........................... | B27B 5/29 D15/133 |
| 8,752,461 | B2 * | 6/2014 | Oberheim ............... | B27B 5/208 83/471.3 |
| 9,844,822 | B2 * | 12/2017 | Cheng .................... | B23D 47/02 |
| 10,207,345 | B2 * | 2/2019 | Marinov ............. | B23D 47/025 |
| 2010/0212467 | A1 | 8/2010 | Oohama | |
| 2016/0067801 | A1 * | 3/2016 | Cheng .................... | B27B 5/188 83/471.3 |
| 2017/0136560 | A1 * | 5/2017 | Chiang ................ | B23D 45/048 |
| 2017/0232534 | A1 * | 8/2017 | Bliznyuk ............. | B23D 45/048 83/471.3 |

(Continued)

*Primary Examiner* — Omar Flores Sanchez (57) ABSTRACT

An articulated chop saw mast section (30) replaces a rigid prior art mast section (22) between a chop saw base (20) and a chop saw swing arm assembly (23'). The articulation of mast section (30) provides a front-to-rear longitudinal movement of the swing arm assembly (23') along an axis that is parallel to the longitudinal axis of a chop saw cutting wheel (26), ultimately providing front-to-rear movement of the cutting wheel (26) along its longitudinal axis. The movement of wheel (26) in this fashion provides a means for optimum adjustment to the geometric relationship between wheel (26) and the material to be cut. The ability of the articulated mast to achieve optimum cutting geometry offers greater cutting efficiency by reducing the point or points of contact between wheel (26) and the material's specific profile.

5 Claims, 13 Drawing Sheets

(56) References Cited

U.S. PATENT DOCUMENTS

2019/0210241 A1\* 7/2019 Chang .................... B23D 47/02
2019/0232520 A1\* 8/2019 Chang .................... B23D 47/02
2023/0356309 A1\* 11/2023 Seifert ................. B23D 45/048

\* cited by examiner

ARTICULATED MAST SECTION FOR CHOP SAWS

CROSS-REFERENCE TO RELATED APPLICATIONS

This application claims the benefit of U.S. provisional patent application, Ser. No. 62/980,445 filed Feb. 24, 2020

FEDERALLY SPONSORED RESEARCH

Not Applicable

SEQUENCE LISTING OR PROGRAM

Not Applicable

BACKGROUND OF THE INVENTION

Field of Invention

The present invention relates to an adjustment mechanism for cutting devices, and more specifically for cutting devices including chop saws, miter saws, sliding compound saws, or a combination thereof.

Prior Art—FIGS. 1, 2, 3, 4

In regard to cutting metallic materials with a metal-cutting cut-off or chop saw, it is known that some material profiles cut quickly and efficiently, while others do not. The determinant factor between a fast, efficient cut and a laborious, inefficient cut is specifically linked to the contact point between the saw's abrasive disc and the material to be cut, and more particularly, to the surface area of that contact point. The smaller the point or points of contact between the disc, or cutting wheel, and the material, the more effective the cut. As such and until now, a saw's cutting efficiency has been limited by the geometry of prior art chop saws.

Figure 1:
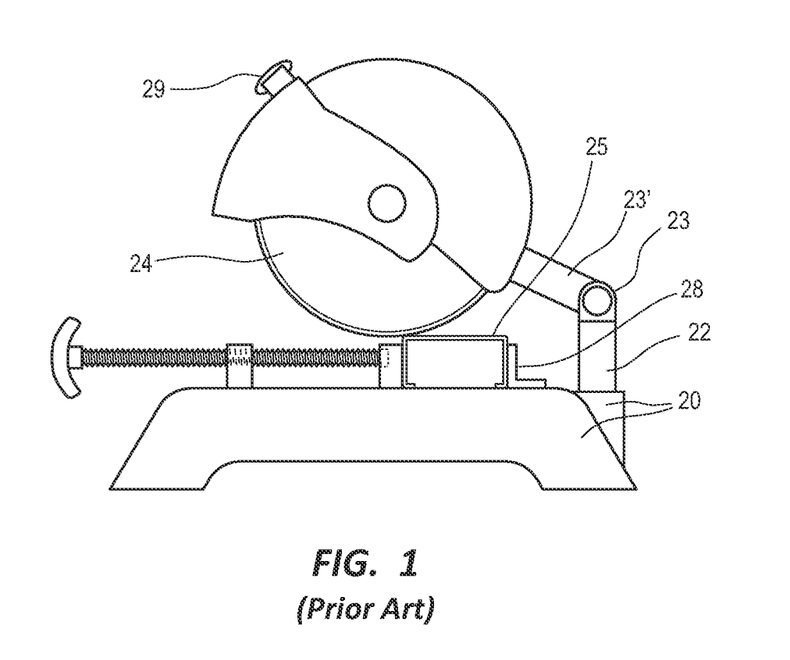
FIG. 1—Prior art chop saw, geometric relationship with narrow steel stud

Prior art chop saws (FIG. 1) comprise a chop saw base 20, a rigid mast section 22 joined to base 20, a jointed end 23 of swing arm assembly 23' affixed to section 22, a motor (not shown) with handle 29 fastened to arm 23', and an abrasive cutting wheel 24 mounted to the motor. FIG. 1 also shows the side-view geometry of a cut being initiated on a narrow steel stud 25 of the three and five-eighths inch to four inch range. Due to the geometric relationship between the cutting wheel and the material, the initial contact point and the two subsequent contact points as the cut progresses are relatively small in comparison to other profiles. These small contact points generate less heat from the abrasive action while the abraded material is separated and spun away in the form of sparks. This scenario lends itself to a rapid, effortless cut.

Figure 2:
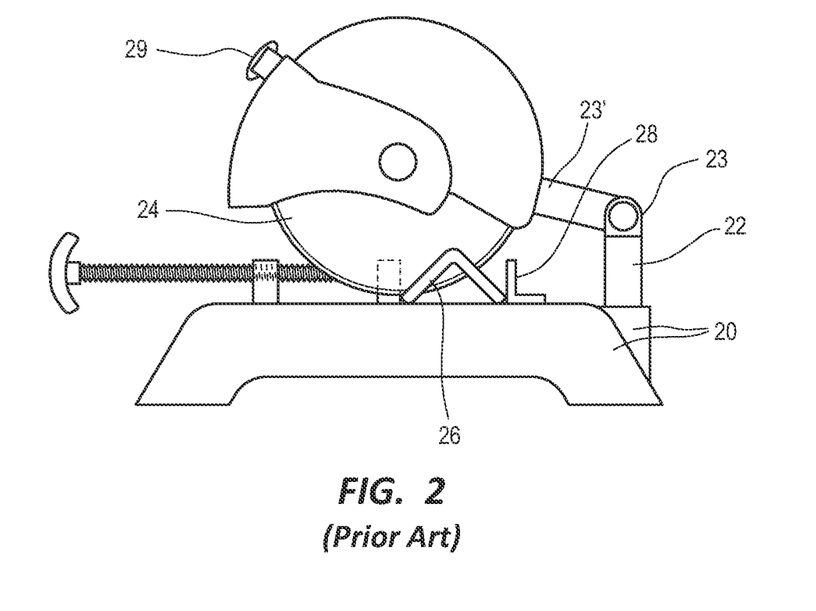
FIG. 2—Prior art chop saw, geometric relationship with inverted angle iron

FIG. 2 shows another material profile, an angle iron section 26 in a specific orientation, which also cuts efficiently with the prior art chop saw geometry. As with the narrow steel stud above, the initial point of contact is relatively small, as are its two subsequent points of contact.

Figure 3:
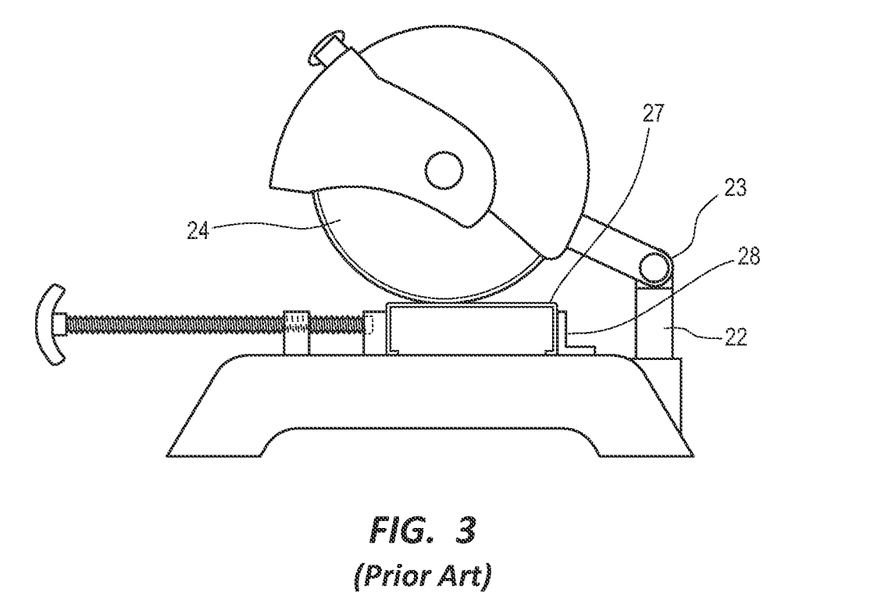
FIG. 3—Prior art chop saw, geometric relationship with wide stud

FIG. 3 shows a wider steel stud 27 (of the six inch and wider width range) prior to cutting. Due to the wheel's diameter and relative position, the contact area between the wheel and the metal (FIG. 4) is effectively increased to the degree that the heat generated from added friction causes a much larger area of material to become red-hot. When the temperature of surrounding steel reaches a red-hot point, abrasive cutting action is minimized, as evidenced by a reduction or absence of sparks, and thus leads to a substantial increase in time required per cut. This rapid temperature increase and reduced cutting ability is even more pronounced when the material is of a thicker gauge; where certain thin-gauge, wider profiles allow deflection of the material to the curvature of the wheel, as shown; or when a bundle of material presents a wide profile.

To overcome this reduced cutting action, a typical chop saw operator will increase the downward force of the wheel. Such an action often powers the wheel through red-hot thinner materials. However, thicker materials require even greater time and energy expenditures to accomplish the task, and in some cases, the cutting action simply ceases. One remedy when a material reaches a red-hot state is to release pressure from the wheel to cool the material, and then to reapply pressure, alternating between the two until the material is cut. Thus, the geometry of prior art metal-cutting saws often requires additional time spent per cut, unnecessary physical exertion on the part of the operator, and increased use of electricity, all while subjecting the motor to prolonged, added bearing pressure and potential premature failure.

Even though most metal-cutting saws offer negligible, time-consuming adjustments to the cutting geometry by way of a movable fence 28, the prior art saws fail to effectively address or overcome the detriments of a largely static geometric relationship between the abrasive wheel's contact point and the material. The only known attempt to address the limitations of metal-cutting chop saw geometry is my own chop saw improvement, a variable-angle cutting deck for metal-cutting chop saws, U.S. application Ser. No. 16/748,753 to Ballew (2020).

Although geometric limitations have long persisted among prior art metal-cutting chop saws, in the field of wood-cutting chop saws, sliding miter saws effectively alter the geometric relationship between a blade and the wood to be cut in order to increase the span of a cut. Even with an alterable geometry, the smooth shafts of its sliding mechanism and its internal bearings are deemed susceptible to malfunction and damage from sparks and the high volume of abraded metallic debris associated with metal-cutting saws. As such, no sliding mechanisms are known to be used in metal-cutting applications.

Objects and Advantages

Accordingly, several objects of the present invention are
(a) to provide an adjustment mechanism for chop saws by which the contact area between a chop saw cutting wheel and a material to be cut may be minimized;
(b) to provide such an adjustment mechanism which is resistant to pitting, contamination, and wear from sparks, and from high volumes of fine, abraded, metallic materials;
(c) to provide such an adjustment mechanism that is quickly and easily readjusted; and
(d) to provide such an adjustment mechanism that may be used with other types of chop saws beyond the metal-cutting type. Additionally, several advantages of the present invention's use over the prior art include
(e) less pressure required for cuts;
(f) less time spent per cut;
(g) reduced operator fatigue;
(h) reduced use of electricity and natural resources; and
(i) reduced wear on chop saw motor and bearings.

Further objects and advantages of my articulated chop saw mast section will become apparent from a consideration of the drawings and ensuing description.

SUMMARY

In accordance with the present invention, an articulated mast section is inserted between a chop saw base and a swing arm assembly and provides a front-to-rear longitudinal swing arm axis that is parallel to the longitudinal axis of a chop saw cutting wheel, thus ultimately allowing front-to-rear movement of the cutting wheel along its longitudinal axis. Movement of the wheel in this manner allows optimum adjustment to the geometric relationship between the wheel and a specific profile of a material to be cut, thereby providing for more efficient cuts.

DRAWINGS

Figures

REFERENCE NUMERALS

20 Chop saw base
22 Rigid mast section
23 Jointed end of swing arm
23' Swing arm assembly
24 Cutting wheel
25 Narrow steel stud
26 Angle iron
27 Wide steel stud
28 Fence
30 Articulated mast section
31 Riser
32 Planar surface of riser
32' Riser flange
33 Self-limiting tabs
34 Fixed hinge, lower static part
35 Fixed hinge, lower active part
36 Traverse hinge, upper static part
37 Traverse hinge, upper active part
40 Mounting block
41 Position lock assembly
42 Mounting plate
42' Mounting plate bores
44 Rod guides
45 Rod
46 Spring retainer
47 Spring
48 Nut
49 Positioning block
49a Position block detent
50 Cable-to-rod knuckle
52 Mounting slot
53 Cable slot
54 Shoulder screw
54' Threaded bore
60 Cable stop
61 Cable sheath
62 Cable
63 Cable end button
65 Keyhole slot
66 Hinged release lever
67 Cable slot
68 Cable stop
70 Alternative upper static part

DETAILED DESCRIPTION

Preferred Embodiment—FIGS. 4, 5A, and FIGS. 6 through 12

Figure 4:
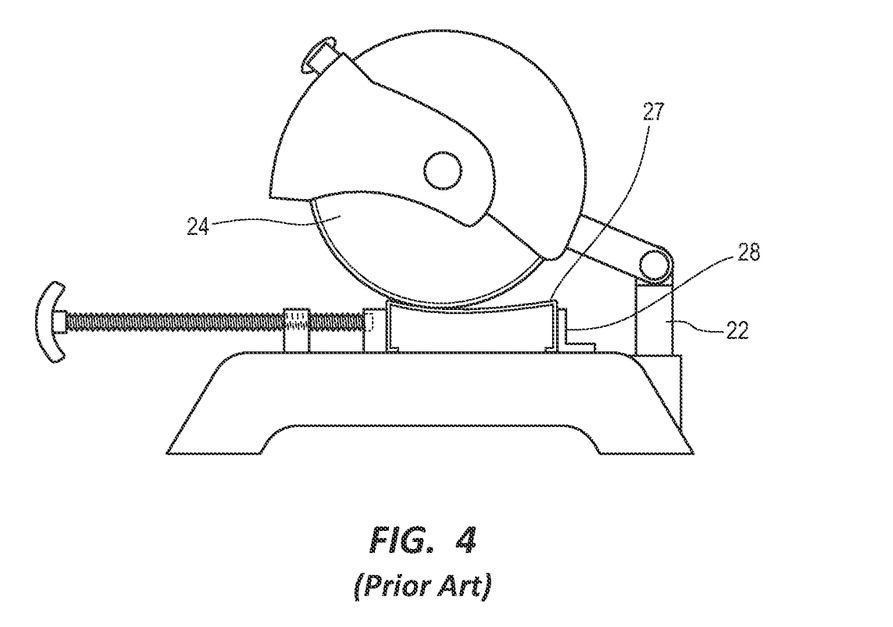
FIG. 4—Prior art chop saw, contact area with wide stud
Figure 5A:
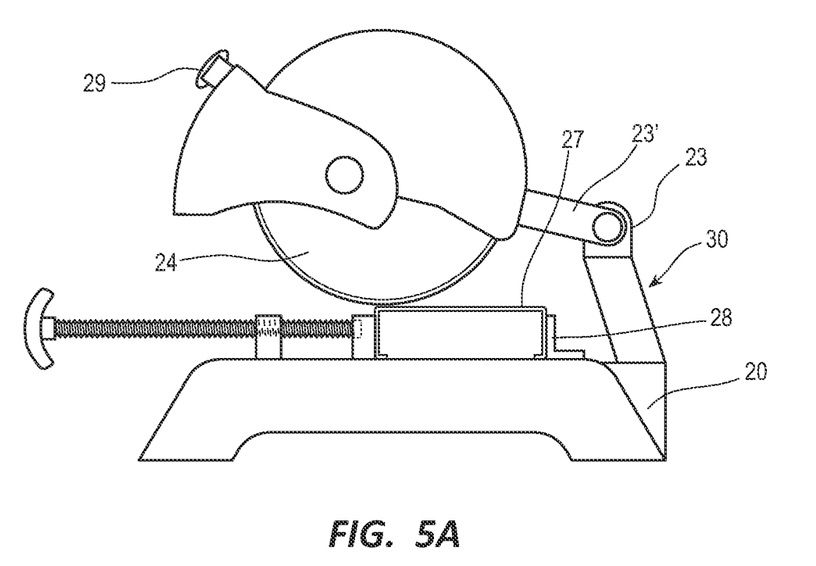
FIG. 5A—Articulated mast section, positioned for wide stud
Figure 5B:
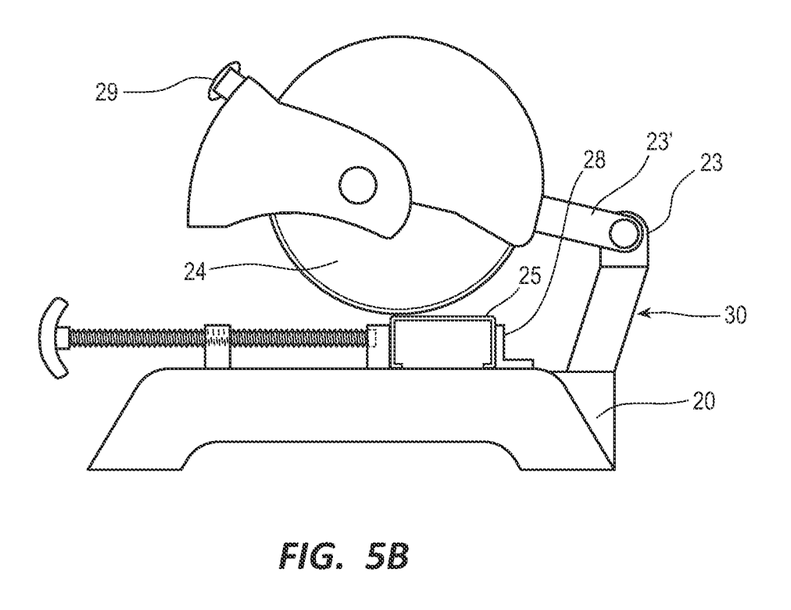
FIG. 5B—Articulated mast section, positioned for narrow stud
Figure 6:
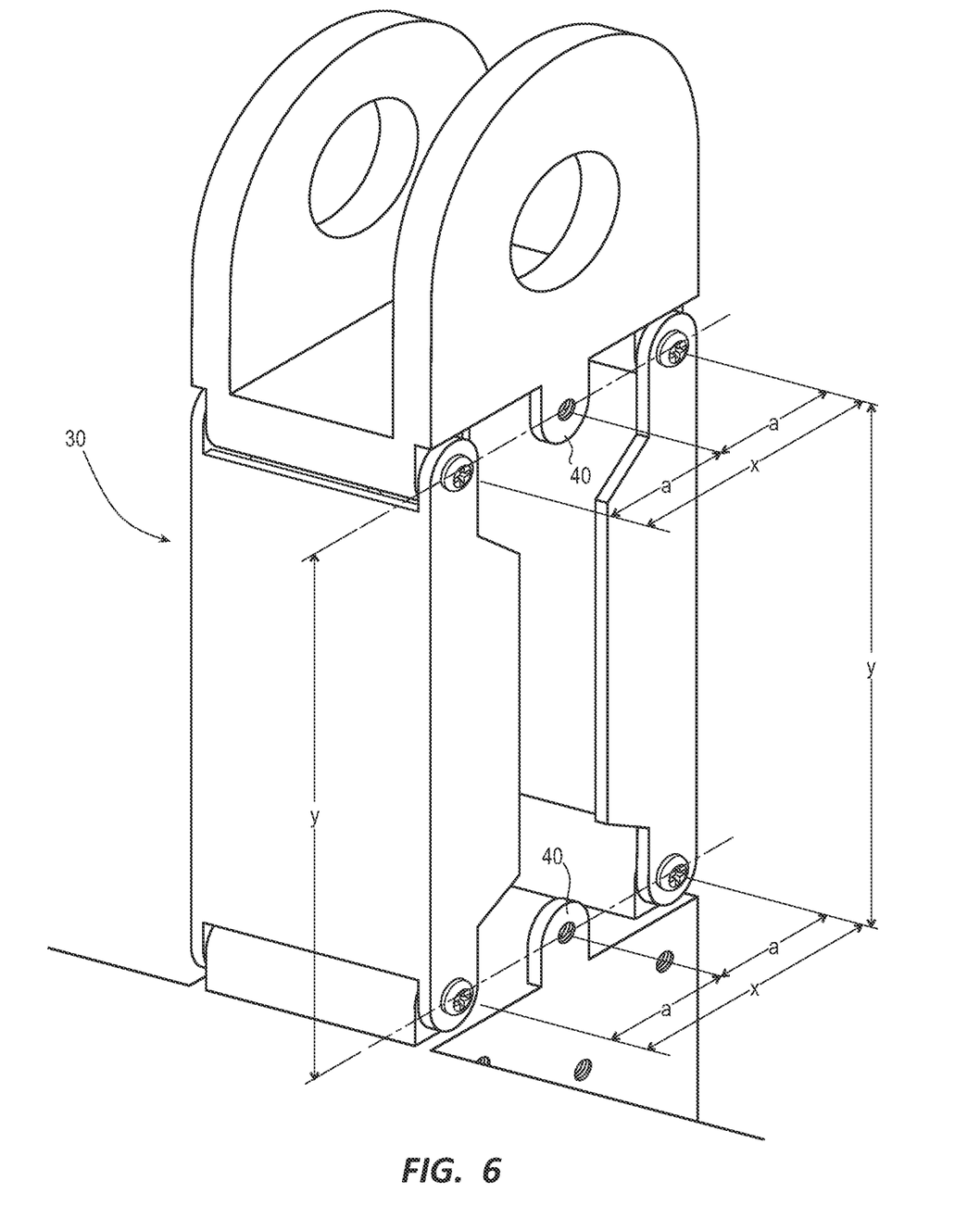
FIG. 6—Relative dimensions of preferred embodiment

For the present invention, mast section 30 (FIG. 5A) replaces prior art mast section 22 (FIG. 4). FIG. 6 shows the relative dimensions of section 30. Dimensions "x" and "y" define the equilateral nature of section 30. Dimension "a" defines an equidistant position of blocks 40.

Figure 7A:
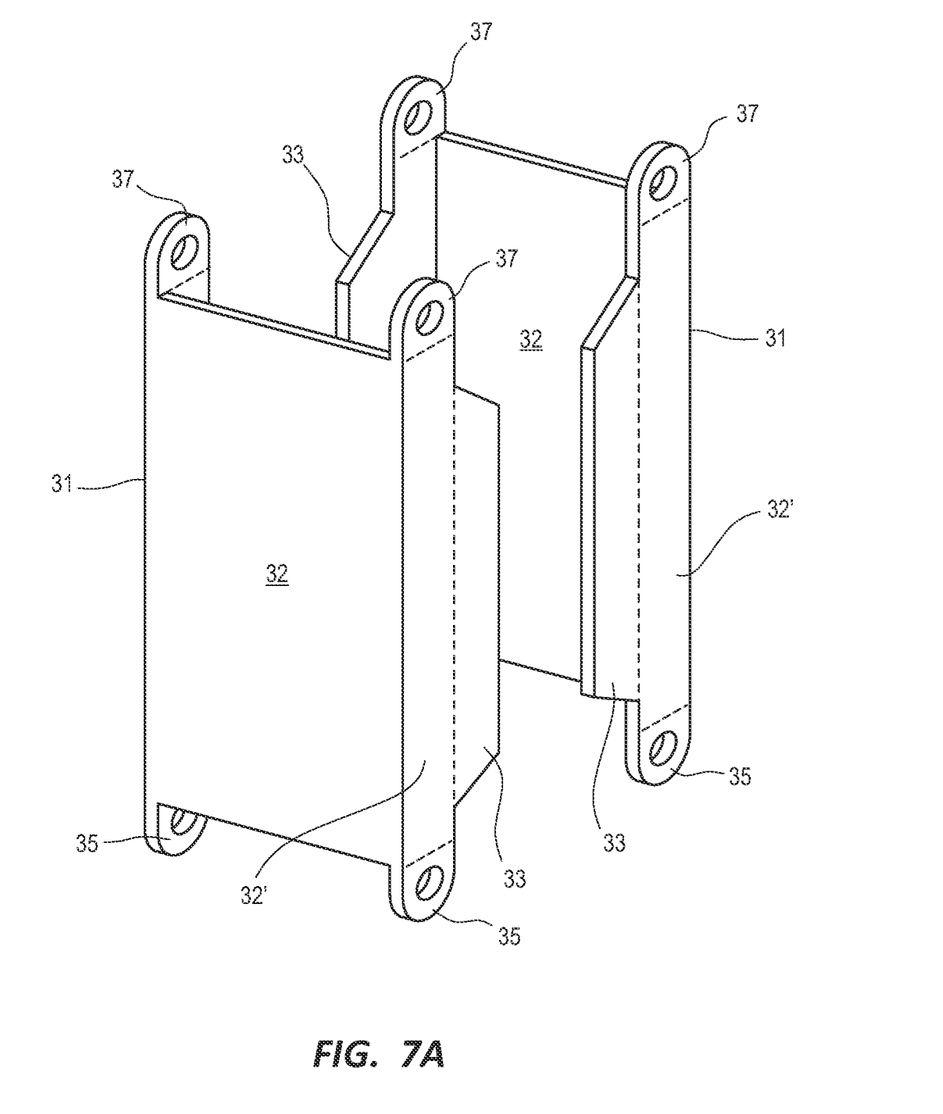
FIG. 7A—Riser detail

FIG. 7A shows risers 31 of predetermined size sufficient to support the weight and functions of the chop saw components above it. Risers 31 comprise identical rigid plates having planar surfaces 32 oriented parallel and symmetrically to one another, with flanges 32' located at right angles to planar surfaces 32 along the surfaces' outer vertical edges, as shown. Self-limiting tabs 33, detailed below, extend from the flanges. At the risers' lower and upper ends, hinge sections 35 and 37 (described below) are joined to risers 31, extending from flanges 32'.

Figure 7B:
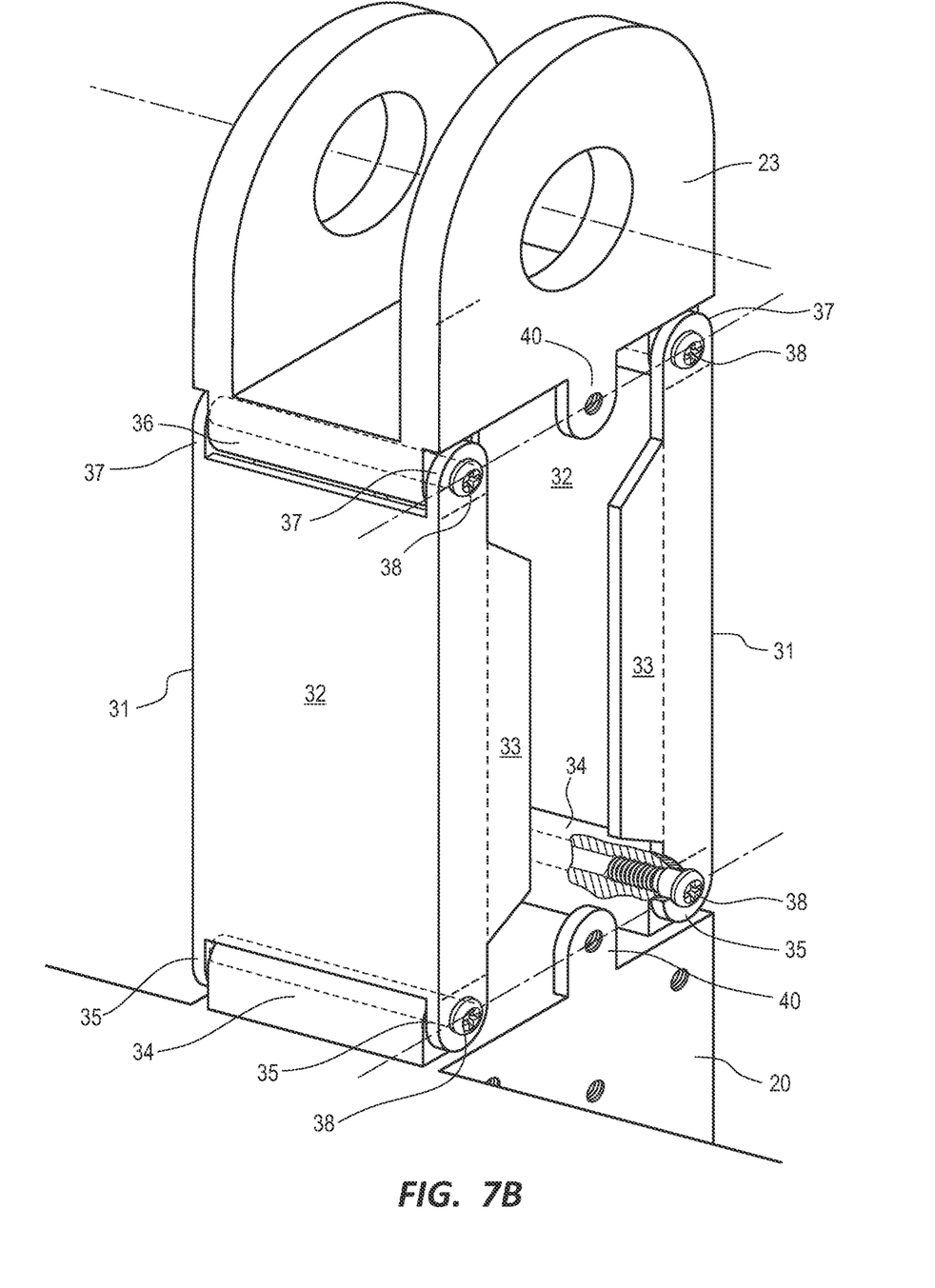
FIG. 7B—Details of preferred embodiment components

FIG. 7B shows a two-part, fixed riser hinge at the lower end of each riser 31. Each fixed hinge comprises lower active parts 35 movably joined to a lower static part 34. Each lower static part 34 comprises a mounting block of predetermined size capable of receiving a riser 31, and has a central pivot axis through which a threaded bore is formed. Static parts 34 are welded to base 20 at the location of prior art section 22 beneath jointed end 23. The central pivot axis of each static part 34 is oriented at a right angle, or perpendicular, to the longitudinal, front-to-rear axis of the cutting wheel 26 (FIG. 5A). The center-to-center distance between the central pivot axes of static parts 34 (FIG. 6, dimension "x") is predetermined for structural stability.

Lower active parts 35 comprise bores at the lower end of each riser 31, as shown in FIG. 7A, which align with the threaded bores of static parts 34. The bores of active parts 35 are sized to accept a shoulder portion of shoulder screws 38, when screws 38 are threaded into static parts 34. The resultant orientation of risers 31 and fixed hinges 34/35 allows risers 31 to rotate perpendicularly to the shared central pivot axis of hinges 34/35. This orientation further provides a front-to-rear longitudinal rotation axis for a given point at the top of a given riser 31 throughout the riser's range of motion that is parallel to the longitudinal axis of wheel 26.

FIG. 7B also shows a two-part traverse riser hinge 36/37 joined to the upper end of each riser 31. Each traverse hinge comprises upper active parts 37 movably joined to an upper static part 36. Each part 36 comprises a mounting block of predetermined size capable of receiving a riser 31, and has a central pivot axis through which a threaded bore is formed. Upper static parts 36 are formed into an underside surface of end 23 so that their central axes are perpendicular to the longitudinal axis of wheel 26. The center-to-center distance between each riser's upper static parts 36 is equal to the center-to-center distance between each riser's lower static parts 34.

Upper active parts 37 comprise bores at the upper end of each riser 31 (FIG. 7A), which align with the threaded bores of upper static parts 36 to provide a common central pivot axis. The bores of active parts 37 are sized to accept the shoulder part of shoulder screws 38, when screws 38 are threaded into static parts 36. The resultant orientation between riser hinges and risers 31 provide a front-to-rear longitudinal axis for section 30 that is parallel to the longitudinal axis of wheel 26. The parallel axes allow front-to-rear movement of wheel 26 along its longitudinal axis by way of element connectivity between mast section 30 and cutting wheel 26.

FIG. 7B also shows mounting blocks 40 joined to base 20 and to jointed end 23. Each block 40 has a bore parallel to screws 38 and has a horizontal centerline on the same plane as the plane between the centerline of screws 38 to the left and right of each block 40. The bores' axis centerlines are also equidistant from the axis centerlines of screws 38 to the left and right of each block 40 (FIG. 6, dimension "a"). The bores of block 40 are threaded to accept fasteners for a position lock assembly, detailed below. A total of four blocks with identical bore dimensions and relative positions, two per side, are used for this embodiment.

In FIG. 7A through FIG. 8D, rotational limit stops, or self-limiting tabs 33 are shown. The width of tabs 33 is determined by the desired angle of rotation of mast section 30. FIGS. 8A-8D illustrate the width calculation and other physical properties.

Figure 8A:
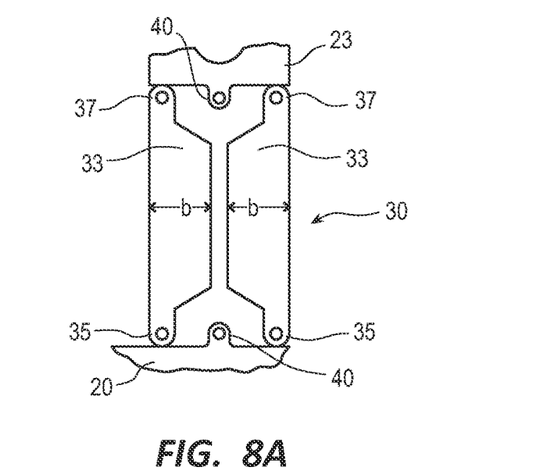
FIG. 8A—Articulated mast section, detail of self-limiting tabs
Figure 8B:
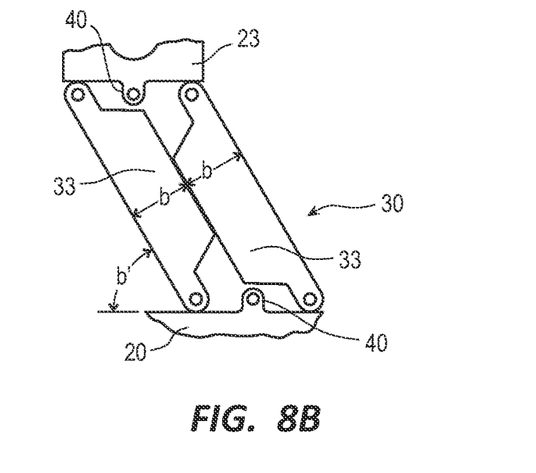
FIG. 8B—Self-limiting tabs, section in frontward position
Figure 8C:
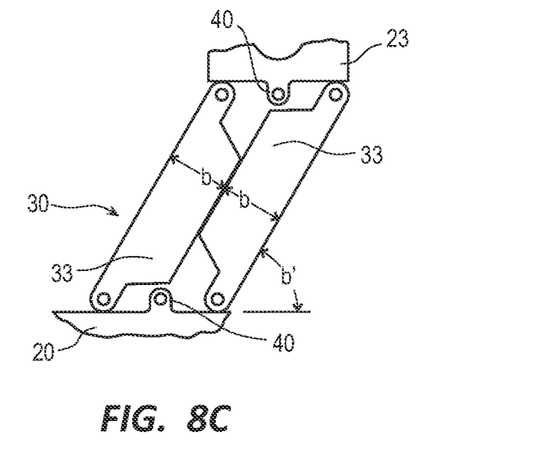
FIG. 8C—Self-limiting tabs, section in rearward position

In FIG. 8A, tabs 33 comprise a given width "b," as shown. In FIG. 8B, section 30 rotates frontward until each tab 33 contacts its opposing tab, resulting in angle "b-prime" for both the frontward and rearward (FIG. 8C) positions. Conversely, if angle b-prime is known, the width of each tab 33 equals one-half the total distance, or width "b", of the dimension across risers at a right angle to risers 31, as shown, when section 30 is positioned at angle b-prime.

Figure 8D:
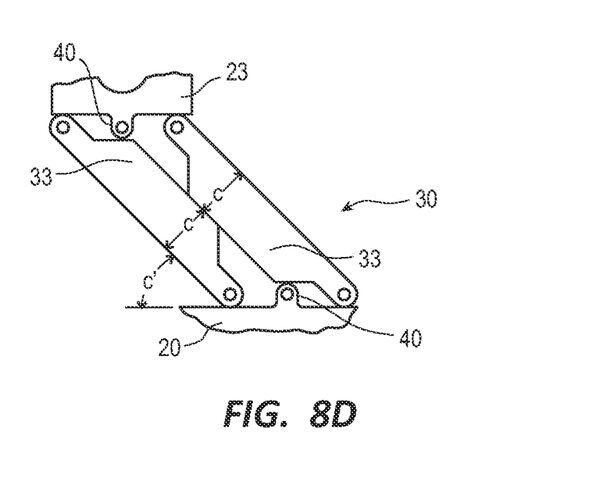
FIG. 8D—Alternative tab size for section angle adjustment

FIG. 8D illustrates that a reduction in tab width "c" increases angle of rotation of section 30 and results in angle "c-prime." Greater tab widths reduce riser travel. The shape of the uppermost and lowermost edges of all tabs 33 is also angled, as shown, to prevent the tabs' contact with blocks 40 throughout the range of motion of section 30.

Figure 9:
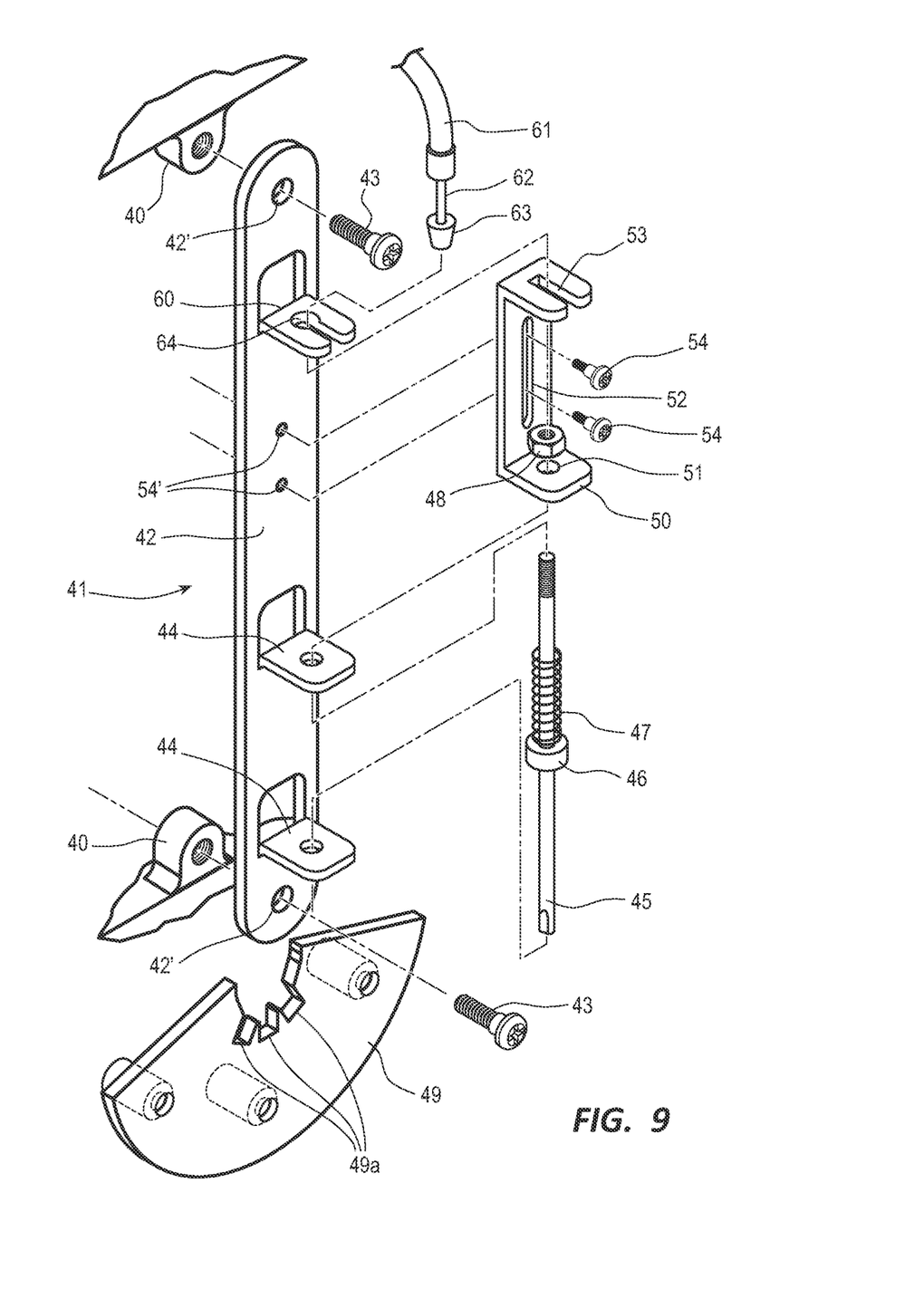
FIG. 9—Exploded view of position lock components

FIG. 9 details an embodiment of a position lock assembly 41. A mounting plate 42 is movably fastened to blocks 40 with shoulder screws 43. Screws 43 pass through bores 42' in plate 42 and into threaded bores of blocks 40. Upper and lower rod guides 44 are located on plate 42 and are bored to accommodate a positioning rod 45. A spring retainer 46 is formed near the middle of rod 45. When rod 45 is positioned into guides 44, a spring 47 is located on rod 45 between retainer 46 and the underside of upper guide 44 by which a downward force is exerted on rod 45. All position lock components are sized to allow travel of rod 45 into and out of a positioning block 49. The top end of rod 45 is threaded and passes through a bore 51 of a cable-to-rod knuckle 50. A nut 48 is threaded onto rod 45, holding it captive to knuckle 50.

Knuckle 50 is shaped as shown and comprises an elongated mounting slot 52, and a cable slot 53. Knuckle 50 is slidably attached to plate 42 by means of shoulder screws 54 which pass through mounting slot 52 and into threaded bores 54' in mounting plate 42.

A cable stop 60 is also located on mounting plate 42. Cable 62 passes through stop 60 by way of slot 64. Cable sheath 61 of cable 62 rests against top of stop 60. The lower end of cable 62 is positioned into slot 53 of knuckle 50 so that button 63 is positioned on the underside of slot 53. The distance between the underside of the cable stop 60 and the top of the cable-to-rod knuckle 50 when knuckle 50 is in its lowest position is equal to or greater than the distance that the positioning rod 45 projects below the bottom of mounting plate 42, as in FIG. 10.

Figure 10:
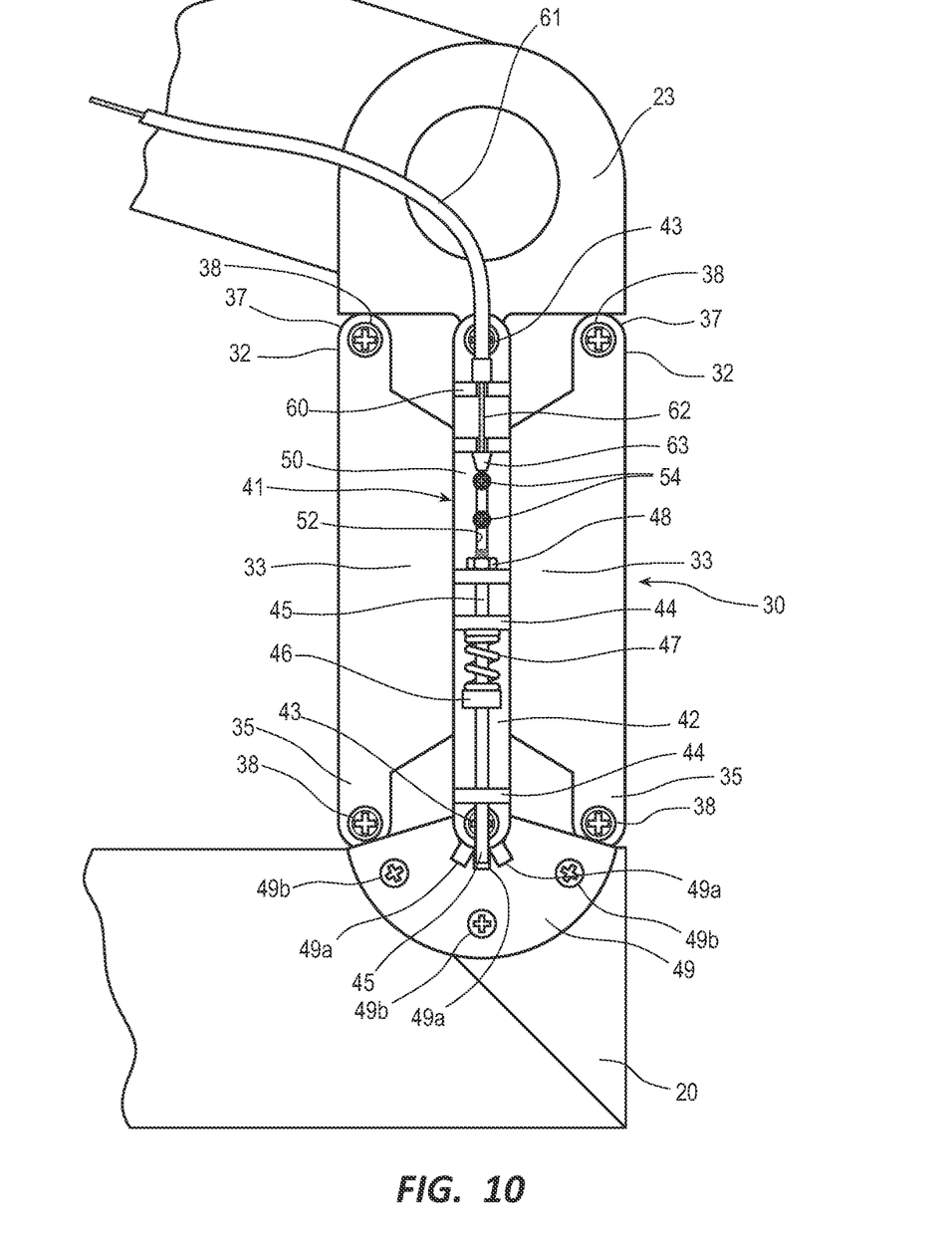
FIG. 10—Front view of assembled position lock
Figure 11A:
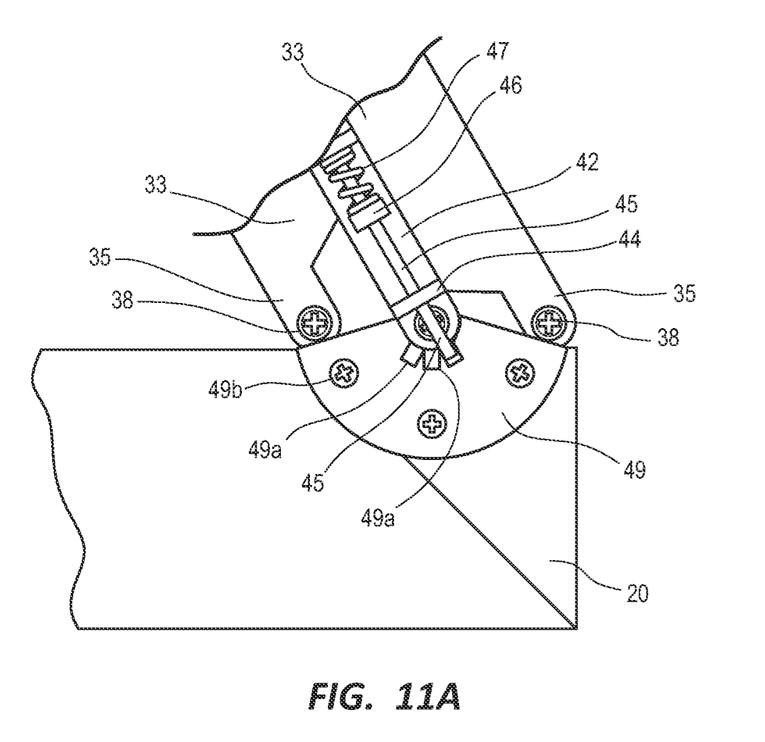
FIG. 11A—Section locked in frontward position
Figure 11B:
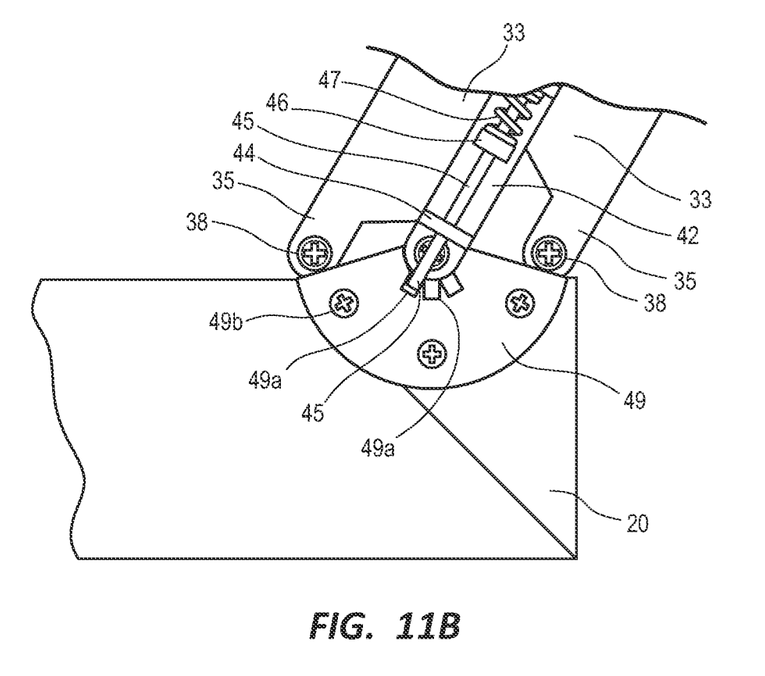
FIG. 11B—Section locked in rearward position

In FIG. 10, the assembled view of the position lock 41 is shown. Although only one lock is seen, the preferred embodiment employs a position lock on each side of section 30. Positioning blocks 49 with a plurality of detents 49a are attached to base 20 with screws 49b. The location of blocks 49, as well as the size and orientation of detents 49a, are all predetermined to accept the lower end of positioning rod 45 throughout the section 30 range of motion. FIGS. 11A and 11B show mast section 30 locked in alternate positions.

Figure 12:
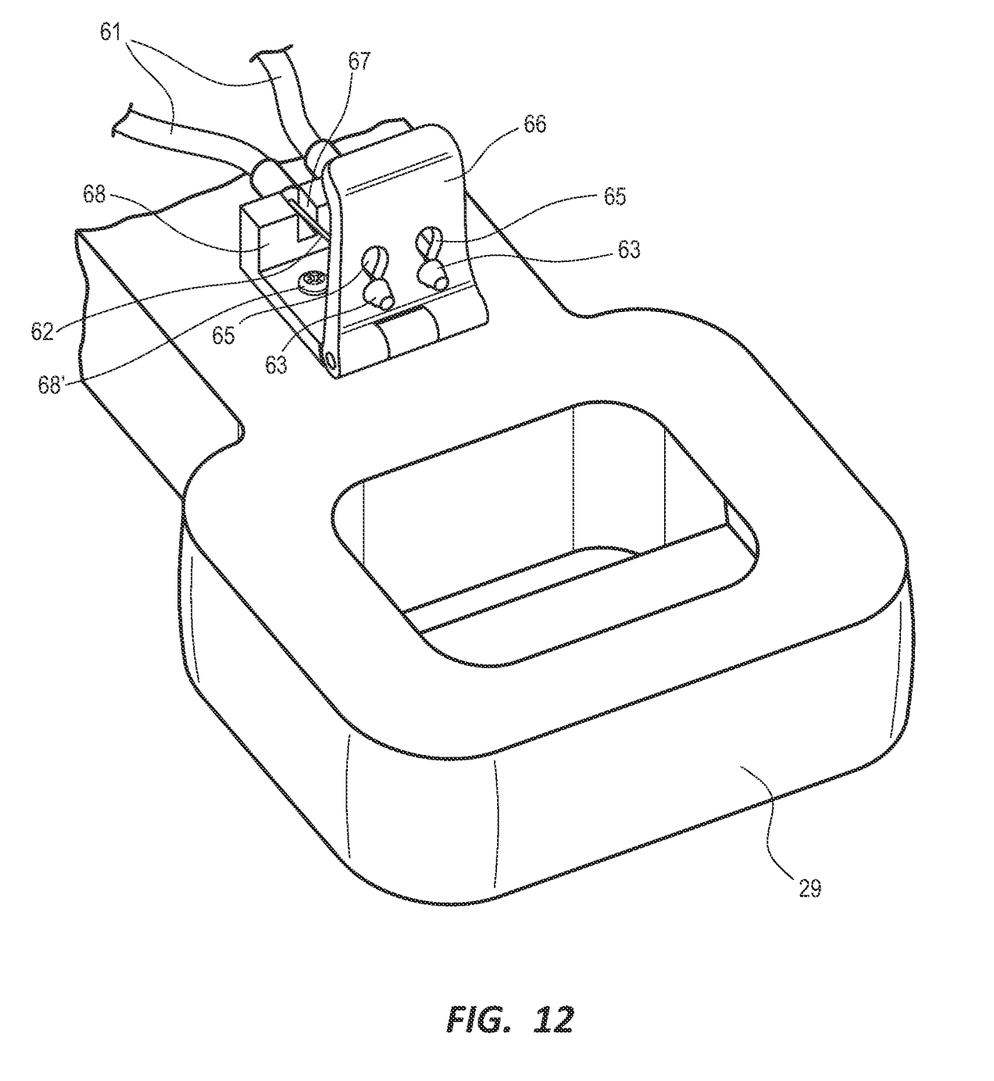
FIG. 12—Release lever for the position lock

FIG. 12 shows an embodiment of a position lock release assembly. A release lever 66 is hinged to a cable stop 68, which is is fastened to handle 29 with screws 68'. Cable end buttons 63 pass through keyhole slots 65 in release lever 66. Cables 62 extend from the back of the lever and into cable slots 67 on stop 68. Cable sheaths 61 rest against the back side of stop 68. The entire release assembly is of predetermined size to provide a sufficient length of cable 62 to be withdrawn from the cable sheath 63 so that rod 45 (FIG. 10) may be withdrawn from detents 49a.

OPERATION

Preferred Embodiment—FIG. 12

To move the cutting wheel to a more efficient orientation, release lever 66 is pulled toward the chop saw operator, thus withdrawing rod 45 from its current detent 49a. Handle 29 is pushed or pulled in the desired direction of cutting wheel reorientation. When proper wheel orientation is achieved, release lever 66 is released, allowing rod 45 to extend into its chosen detent 49a.

Figure 13:
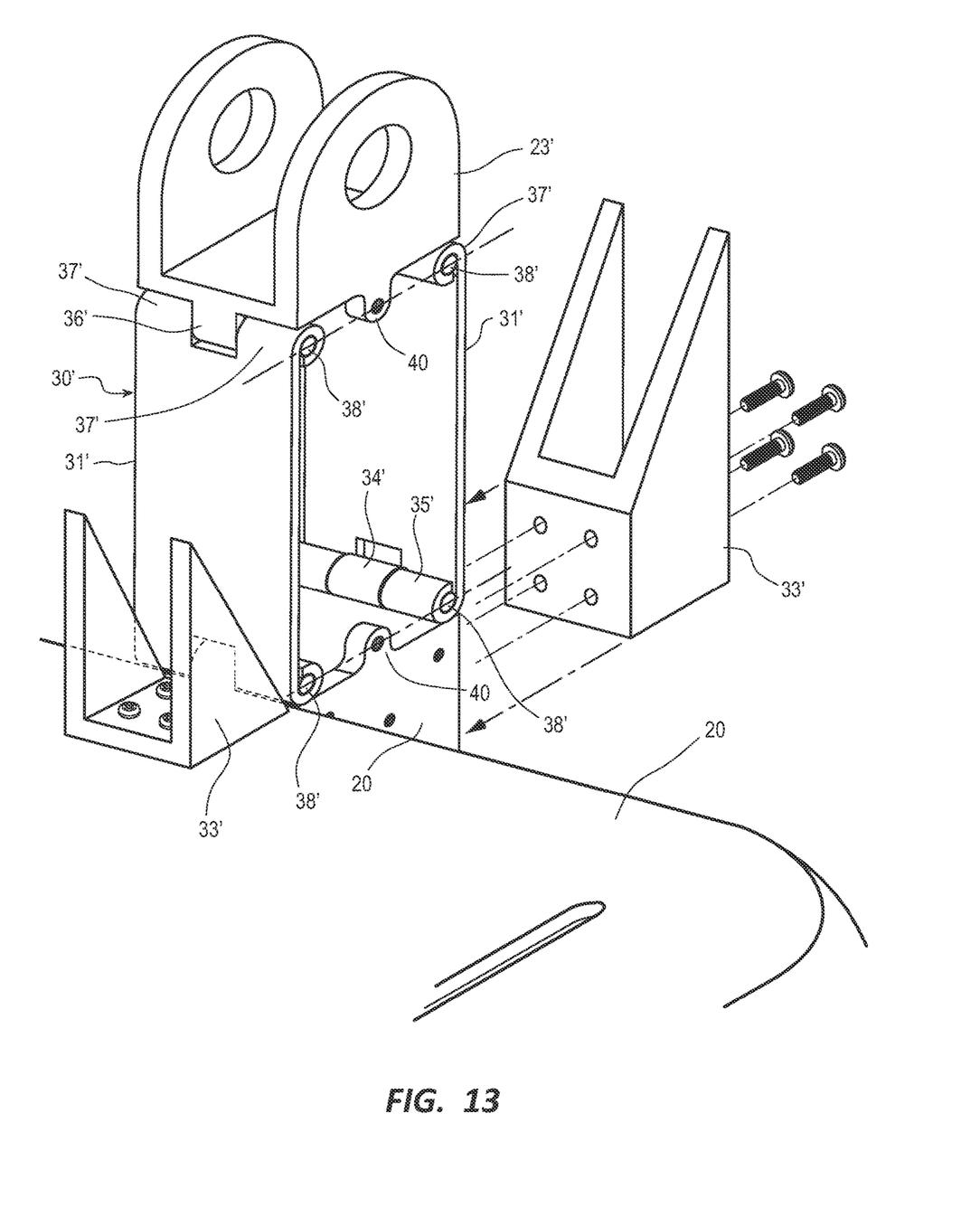
FIG. 13—Alternative risers with barrel joints

Alternative Barrel-Joint Hinges and Limit Blocks—Description and Operation—FIG. 13

FIG. 13 shows alternative fixed hinges 34'/35' and traverse hinges 36'/37' comprising barrel joints of the type commonly found in door hinges. Lower static parts 34' are welded, cast, machined, formed into, or otherwise joined to base 20. Lower active parts 35' comprising barrel joints are formed into the lower ends of risers 31', as shown. Upper static parts 36' are joined to the underside of jointed end 23' in the same fashion as lower static parts 35' to base 20.

Upper active parts 37' comprising barrel joints are formed into the upper ends of risers 31', as shown. A pin 38' is inserted into a void throughout the mated hinges' common central pivot axis, as shown. Alternative rotational limit stops are also shown. Limit blocks 33', comprising rigid angled surfaces fastened to base 20, stop movement of section 30 at predetermined angles. Position lock assemblies 41 are added, and operation is identical to the preferred embodiment.

Figure 14:
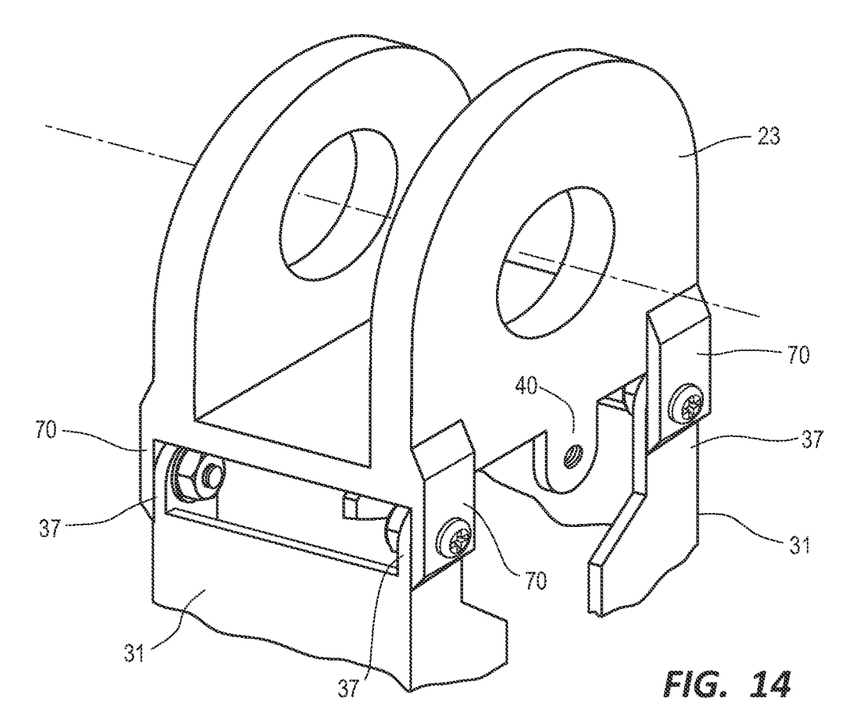
FIG. 14—Alternative traverse hinges

Alternative Traverse Hinges—Description and Operation—FIG. 14

The preferred embodiment shows traverse riser hinges 36/37 having upper static parts 36 that are formed into an underside surface of jointed end 23'. FIG. 14 shows alternative upper static parts 70 that are cast or machined into a vertical outside surface of jointed end 23. Upper static parts 70 mate with the preferred embodiment's upper active parts 37 at the outside surfaces of active parts 37. Individually formed static parts 70 may also be joined to end 23 by other means such as welding or by threaded fastener. In a similar fashion to the traverse hinges above, this embodiment's fixed (lower) riser hinges (not shown) may comprise lower static parts that are also mated at the outside surfaces of the risers' lower active parts. Position lock assemblies 41 are added, and operation is identical to the preferred embodiment.

Figure 15:
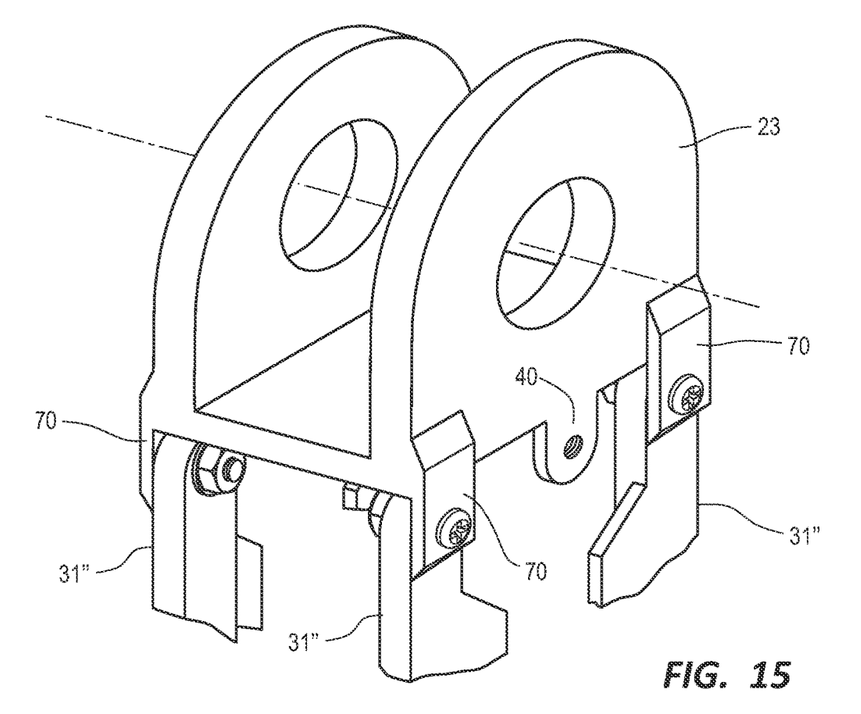
FIG. 15—Alternative individual risers

Alternative Independent Risers—Description and Operation—FIG. 15

For this embodiment, a plurality of individual risers each comprising an upper active part and a lower active part is mated to its corresponding upper static part and lower static part. Position lock assemblies 41 are added, and operation is identical to the preferred embodiment.

Conclusion, Ramifications and Scope of Invention

Thus the reader will see that the articulated mast section of the present invention provides a device by which the geometric relationship between a chop saw cutting wheel and the material to be cut may be easily and quickly altered to a more efficient cutting geometry. While my above description contains many specificities, these should not be construed as limitations on the scope of the invention, but as an exemplification of one preferred embodiment thereof. Many other variations are possible. For example:

Fixed riser hinges 34/35 of the preferred embodiment are described as fastened to base 20 by welding. Alternate forms of fastening for this or any hinge component include threaded fastening and rivets. In addition, manufacturer preferences may dictate that hinge components be cast, formed into, stamped, 3-D printed, CNC machined, or otherwise affixed or joined to risers 31, base 20, and to arm end 23.

The position lock release mechanism detailed in FIG. 12 is of rudimentary style to draw a cable through its sheath. A bi-lateral, thumb-activated release lever may be desirable. Such a lever would place two levers providing the same function within operational proximity to a right-hand thumb and a left-hand thumb of an operator's hand while the hand is grasping the chop saw handle 29. Such a bi-lateral release lever would provide ease of cutting wheel repositioning by a single hand without releasing the handle during cutting operations.

Components of the position lock assembly are shown as a particular relative size. More robust components, including a larger rod diameter 45, may be desired. In addition, multi-directional rods 45 may also be desired, in which rods travel not only downward into detents, but also upwards into detents. Such an embodiment could draw the rod ends toward one another, to then be released into their chosen detents, thus providing four distinct, locking contact points.

Self limiting tabs 33, limit blocks 33', and position lock assembly 41 may be used separately, together in any combination, or eliminated entirely.

Upper active parts 37 and lower active parts 35 for the preferred embodiment's traverse and fixed riser hinges are shown as one-piece with risers 31. All active parts for any embodiment may be separately formed and joined to the risers.

Accordingly, the scope of the invention should be determined not by the embodiments illustrated, but by the appended claims and their legal equivalents.

What is claimed is:

1. An articulating chop saw mast section for altering a geometric relationship between a chop saw cutting wheel and a material resting on a chop saw base, said geometric relationship comprising locations along a longitudinal axis of said cutting wheel, said mast section being positioned between said chop saw base and a jointed end of a swing arm, said swing arm movably supporting a motor to which said cutting wheel is mounted; said mast section comprising a plurality of riser hinges, a plurality of risers configured to rotate between said riser hinges, and a predetermined quantity of rotational limit stops; each of said risers being substantially equal in length and oriented substantially parallel to one another, said risers comprising a lower end and an upper end, said riser hinges comprising fixed hinges and traverse hinges, (a) each of said fixed hinges comprising a lower static part movably joined to a lower active part, said lower static part and said lower active part sharing a central pivot axis,
      (1) said lower static part being joined to said chop saw base at a predetermined location below said jointed end of said swing arm so that said central pivot axis is oriented perpendicularly to said longitudinal axis of said cutting wheel,
      (2) said lower active part being joined to said lower end of each of said risers so that said upper end of said risers rotate along a longitudinal rotation axis that is perpendicular to said central pivot axis and parallel to said longitudinal axis of said cutting wheel,
   (b) each of said traverse hinges comprising an upper active part movably joined to an upper static part, said upper static part and said upper active part sharing a central pivot axis,
      (1) said upper static part being joined to said jointed end of said swing arm at a predetermined location so that said central pivot axis is oriented perpendicularly to said longitudinal axis of said cutting wheel,
      (2) said upper active part being joined to said upper end of each of said risers so that said risers rotate along a longitudinal axis parallel to the longitudinal axis of said cutting wheel;
   said rotational limit stops providing rigid structure against which an opposing rigid element of said mast section contacts said rigid structure at a predetermined angle of rotation, thereby limiting movement of said mast section along said longitudinal rotation axis.

2. The mast section of claim 1, wherein said rotational limit stops comprise a first self-limiting tab extending from a first vertical edge of a first riser toward a second self-limiting tab extending from a second vertical edge of a second riser along a plane of said longitudinal rotation axis between said first riser and said second riser.

3. The mast section of claim 1, wherein said rotational limit stops comprise a predetermined quantity of limit blocks joined to said chop saw base, said limit blocks comprising rigid angled surfaces adjacent to said mast section when said mast section is at a predetermined limit of travel.

4. The chop saw of claim 1 wherein said mast section further includes a position lock assembly configured to lock said mast section at a specific rotation angle relative to said chop saw base.

5. The mast section of claim 4 wherein said position lock assembly comprises position lock components configured to apply force to a spring-loaded rod into one of a plurality of detents that align with said rod throughout said mast's range of motion, and a release mechanism configured to unlock said position lock by applying a force to a lever to cause retraction of said spring-loaded rod from said detent to allow free movement of said mast section.

\* \* \* \* \*